United States Patent
Lee et al.

(10) Patent No.: US 11,809,290 B2
(45) Date of Patent: Nov. 7, 2023

(54) STORAGE SYSTEM AND STORAGE QUEUE PROCESSING FOLLOWING PORT ERROR

(71) Applicant: SAMSUNG ELECTRONICS CO., LTD., Suwon-si (KR)

(72) Inventors: Jongwon Lee, Seoul (KR); Jangwook Park, Yongin-si (KR); Kwanhu Bang, Seoul (KR); Joonwhan Bae, Suwon-si (KR); Brian Myungjune Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 17/503,753

(22) Filed: Oct. 18, 2021

(65) Prior Publication Data

US 2022/0138059 A1     May 5, 2022

(30) Foreign Application Priority Data

Nov. 5, 2020   (KR) .................. 10-2020-0147082

(51) Int. Cl.
*G06F 11/20*      (2006.01)
*G06F 3/06*       (2006.01)

(52) U.S. Cl.
CPC .......... *G06F 11/201* (2013.01); *G06F 3/0604* (2013.01); *G06F 3/067* (2013.01); *G06F 3/0617* (2013.01); *G06F 3/0659* (2013.01); *G06F 11/2007* (2013.01)

(58) Field of Classification Search
CPC .... G06F 11/201; G06F 3/0659; G06F 3/0617; G06F 3/0619; G06F 3/064; G06F 3/0656; G06F 11/1407; G06F 11/141; G06F 11/1474; G06F 11/1658; G06F 11/1662; G06F 11/1675; G06F 11/1683; G06F 11/1687; G06F 11/2002; G06F 11/2005; G06F 11/2007; G06F 11/2017; G06F 11/2053; G06F 11/2089; G06F 11/2092; G06F 11/2097
See application file for complete search history.

(56) References Cited

U.S. PATENT DOCUMENTS

| | | | |
|---|---|---|---|
| 5,459,864 A * | 10/1995 | Brent ................. | G06F 11/2017 714/E11.015 |
| 6,728,210 B1 | 4/2004 | El-Khoury et al. | |
| 7,539,780 B2 * | 5/2009 | Makhervaks ........... | H04L 67/10 709/212 |
| 7,979,517 B1 | 7/2011 | Wang et al. | |
| 8,204,980 B1 | 6/2012 | Sandstrom et al. | |
| 8,848,575 B2 | 9/2014 | Vobbilisetty | |
| 9,917,767 B2 | 3/2018 | Chen et al. | |

(Continued)

OTHER PUBLICATIONS

European Search Report dated Apr. 5, 2022.

*Primary Examiner* — Gabriel Chu
(74) *Attorney, Agent, or Firm* — Lee IP Law, P.C.

(57) ABSTRACT

A storage system includes a host including a host queue storing a plurality of commands and a storage device including a storage queue exchanging commands with the host through a first port or a second port, and storing the exchanged commands, wherein the storage device is configured to, when a communication error has occurred through the first port, transfer information about a command stored in the storage queue before the error occurrence to the host through the second port.

19 Claims, 16 Drawing Sheets

(56) References Cited

U.S. PATENT DOCUMENTS

| | | |
|---|---|---|
| 10,649,950 B2 | 5/2020 | Romem et al. |
| 2001/0014954 A1* | 8/2001 | Purcell ................ G06F 11/2007 |
| | | 714/E11.078 |
| 2007/0055797 A1 | 3/2007 | Shimozono |
| 2008/0126615 A1* | 5/2008 | Sinclair ................ G06F 11/201 |
| | | 710/38 |
| 2014/0025986 A1* | 1/2014 | Kalyanaraman .... G06F 11/2028 |
| | | 714/E11.073 |
| 2015/0006663 A1 | 1/2015 | Huang |
| 2015/0242138 A1* | 8/2015 | McKean ............. G06F 12/0868 |
| | | 709/216 |
| 2016/0117119 A1 | 4/2016 | Kim |
| 2017/0286205 A1 | 10/2017 | Jeong et al. |
| 2019/0079817 A1 | 3/2019 | Tomlin |

* cited by examiner

STORAGE SYSTEM AND STORAGE QUEUE PROCESSING FOLLOWING PORT ERROR

CROSS-REFERENCE TO RELATED APPLICATION

Korean Patent Application No. 10-2020-0147082, filed on Nov. 5, 2020, in the Korean Intellectual Property Office, and entitled: "Storage System and Operating Method Thereof," is incorporated by reference herein in its entirety.

BACKGROUND

1. Field

Embodiments relate to a storage system, and more particularly, to a storage system including a host and a storage device.

2. Description of the Related Art

An example of a flash memory-based mass storage device is a solid state drive (hereinafter, SSD). With the explosive increase in demand for SSDs, their uses are diversifying.

SUMMARY

Embodiments are directed to a storage device, including: a network interface including a plurality of ports configured to communicate with a host, the plurality of ports including a first port and a second port; and a storage controller including a storage submission queue and a storage completion queue. The storage submission queue may be configured to store commands to be processed from among commands received from the host. The storage completion queue may be configured to store processed commands, store a first command received from the host through the first port in the storage submission queue, and upon occurrence of a communication error through the first port, transfer identifier information of the first command to the host through the second port. The storage controller may be configured to receive identifier information of a second command from the host through the second port upon the error occurrence, and transfer identifier information of a third command, which is processed later than the second command among the processed commands stored in the storage completion queue before the error occurrence, to the host through the second port.

Embodiments are also directed to an operating method of a storage device that communicates with a host through a plurality of ports included in a network interface of the storage device, the operating method including: exchanging command or identifier information of a command with the host through a first port among the plurality of ports; in response to occurrence of a communication error through the first port, providing first identifier information of a first command, received from the host before the error occurrence, to the host through a second port among the plurality of ports; and receiving second identifier information of a second command, provided to the host before the error occurrence, from the host through the second port.

Embodiments are also directed to a storage system, including: a host including a host queue configured to store a plurality of commands; and a storage device including a storage queue configured to exchange commands with the host through a first port or a second port, and to store the exchanged commands. The storage device may be configured to, upon occurrence of a communication error through the first port, transfer information about a command stored in the storage queue before the error occurrence to the host through the second port.

BRIEF DESCRIPTION OF THE DRAWINGS

Features will become apparent to those of skill in the art by describing in detail example embodiments with reference to the attached drawings in which.

DETAILED DESCRIPTION

Hereinafter, example embodiments will be described with reference to the accompanying drawings.

Figure 1:
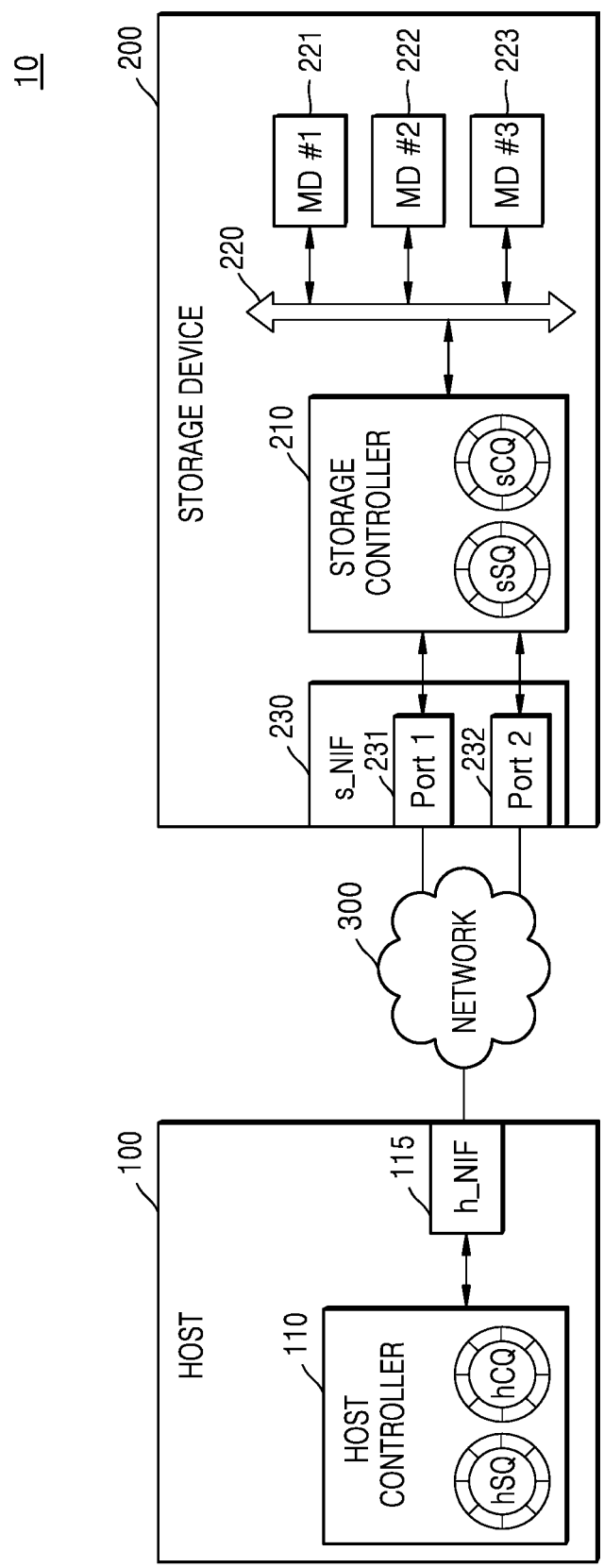
FIG. 1 is a diagram illustrating a storage system according to an example embodiment.

FIG. 1 is a diagram illustrating a storage system 10 according to an example embodiment.

Referring to FIG. 1, the storage system 10 may include a host 100, a network 300, and a storage device 200. The host 100 and the storage device 200 may exchange capsules over the network 300. A capsule may be a transmission unit of data and/or commands. The capsule may be referred to as a packet, a frame, a message, etc. A capsule transmitted by the host 100 may be referred to as a command capsule. A capsule transmitted by the storage device 200 may be referred to as a response capsule. The network 300 may be a network fabric such as Fibre Channel, Ethernet, or InfiniBand.

The host 100 and the storage device 200 may each include at least one network interface (NIF) to be connected to the network 300. The network interface may be referred to as a network interface card, a network interface controller, a LAN card, an Ethernet adapter, an Ethernet card, etc.

The host 100 may include a host network interface 115 (h_NIF) and a host controller 110. The storage device 200 may include a storage network interface (s_NIF) 230, a storage controller 210, and a plurality of memory devices 221, 222, and 223 (MD #1, MD #2, and MD #3, respectively). The storage network interface 230 may include a plurality of ports, e.g., a first port 231 (Port 1) and a second port 232 (Port 2). Each of the plurality of ports 231 and 232 may be connected to the network 300.

The host network interface 115 may provide or receive the capsule to or from the storage device 200 over the network 300. The capsule may include identifier information of the ports 231 and 232 included in the storage device 200. The network 300 may transfer the capsule to a port corresponding to the identifier information.

The host controller 110 may generate a plurality of commands. A command may be a write command, a read command, or an erase command, but is not limited thereto.

The host controller 110 may include a pair of queues hSQ and hCQ storing commands, that is, a host submission queue hSQ and a host completion queue hCQ. Herein, the host submission queue hSQ and the host completion queue hCQ may also be referred to collectively as host queues.

The host controller 110 may store the generated commands in the host submission queue hSQ. The host controller 110 may sequentially provide the commands stored in the host submission queue hSQ to the storage device 200. The commands may be provided to the storage device 200 in the form of a capsule. The storage device 200 may sequentially process the received commands and provide information about the processed commands to the host 100. The information about the commands may be identifier information of the commands. The host controller 110 may store commands corresponding to the received identifier information in the host completion queue hCQ. The host controller 110 may remove the commands corresponding to the received identifier information from the host submission queue hSQ.

The storage network interface 230 may provide or receive the capsule to or from the host 100 through each of the plurality of ports 231 and 232. For convenience of explanation, it may be described later that the storage controller 210 is firstly connected to the first port 231, and when an error occurs in the first port 231, the storage controller 210 is connected to the second port 232. The capsule may include identifier information of the host network interface 115 included in the host 100. The network 300 may transfer the capsule to the host network interface 115 with reference to the identifier information.

The storage controller 210 may include a pair of queues sSQ and sCQ that store commands, that is, a storage submission queue sSQ and a storage completion queue sCQ. The storage submission queue sSQ and the storage completion queue sCQ may be referred to collectively as storage queues.

The storage controller 210 may sequentially store commands received from the host 100 through the first port 231 in the storage submission queue sSQ. The storage controller 210 may process the commands by providing the commands stored in the storage submission queue sSQ to the memory devices 221, 222, and 223 through a bus 220. When the commands stored in the storage submission queue sSQ are processed, the storage controller 210 may store the processed commands in the storage completion queue sCQ. The storage controller 210 may remove the processed commands from the storage submission queue sSQ. The storage controller 210 may provide information about the commands stored in the storage completion queue sCQ, that is, the processed commands, to the host 100. The information about the processed commands may be identifier information of the processed commands.

When the error occurs in the first port 231, the storage controller 210 may connect to the second port 232. When the error occurs in the first port 231, the capsule transmitted by the host 100 and the capsule transmitted by the storage device 200 may be lost. Accordingly, the command transmitted by the host 100 before the error occurrence may not reach the storage device 200 or the storage controller 210. However, the host 100 may not recognize the lost command and may transmit a command different from the lost command to the storage device 200 through the second port 232. That is, because the lost command may not be processed even after the error occurs, the reliability of the storage system 10 may deteriorate. Meanwhile, due to the error, the identifier information of the processed commands transmitted by the storage device 200 may not reach the host controller 110. However, the storage device 200 may not recognize the lost identifier information, and may transmit identifier information different from the lost identifier information to the host 100 through the second port 232. That is, because the lost identifier information may not be transmitted to the host 100 even after the error occurs, the host 100 may determine that the command corresponding to the lost identifier information has not been processed. That is, the reliability of the storage system 10 may deteriorate due to the error.

In the storage system 10 according to the present example embodiment, when the error occurs in the first port 231, the host 100 and the storage device 200 may exchange information about the command received before the error occurrence through the second port 232. Specifically, the storage device 200 may transmit the identifier information of the command received from the host 100 before the error occurrence to the host 100. Based on the received identifier information, the host 100 may check the command received by the storage device 200 before the error occurrence, and transmit a command other than the checked command among commands stored in the host submission queue hSQ. The transmitted command may be the command lost due to the error. Accordingly, because the commands stored in the host submission queue hSQ may be sequentially processed without a miss, the reliability of the storage system 10 may be improved. Also, the host 100 may transmit the identifier information of the command received from the storage device 200 to the storage device 200 before the error occurrence. The storage device 200 may check the identifier information of the command received by the host 100 before the error occurrence based on the received identifier information, and transmit identifier information of a command other than the command corresponding to the checked identifier information among the commands stored in the storage submission queue sCQ to the host 100. The transmitted identifier information may be identifier information lost due to the error. Accordingly, because identifier information of the commands stored in the storage completion queue sCQ may be sequentially transmitted to the host 100 without a miss, the reliability of the storage system 10 may be improved.

The storage controller 210 may be connected to the plurality of memory devices 221, 222, and 223 through the bus 220. The bus 220 may include one of Peripheral Component Interconnect Express (PCIe), Small Computer System Interface (SCSI), Serial Advanced Technology Attachment (SATA), or Integrated Drive Electronics (IDE), but is not limited thereto.

Each of the memory devices 221, 222, and 223 may perform an operation corresponding to the command received from the storage controller 210. Each of the memory devices 221, 222, and 223 may provide operation completion information to the storage controller 210 after performing the operation. The processed command may be removed from the storage submission queue sSQ and stored in the storage completion queue sCQ. Each of the plurality of memory devices 221, 222, and 223 may include at least one of flash memory, phase changed random access memory (PRAM), resistive random access memory (ReRAM), dynamic random access memory (DRAM), and static random access memory (SRAM).

Figure 2:
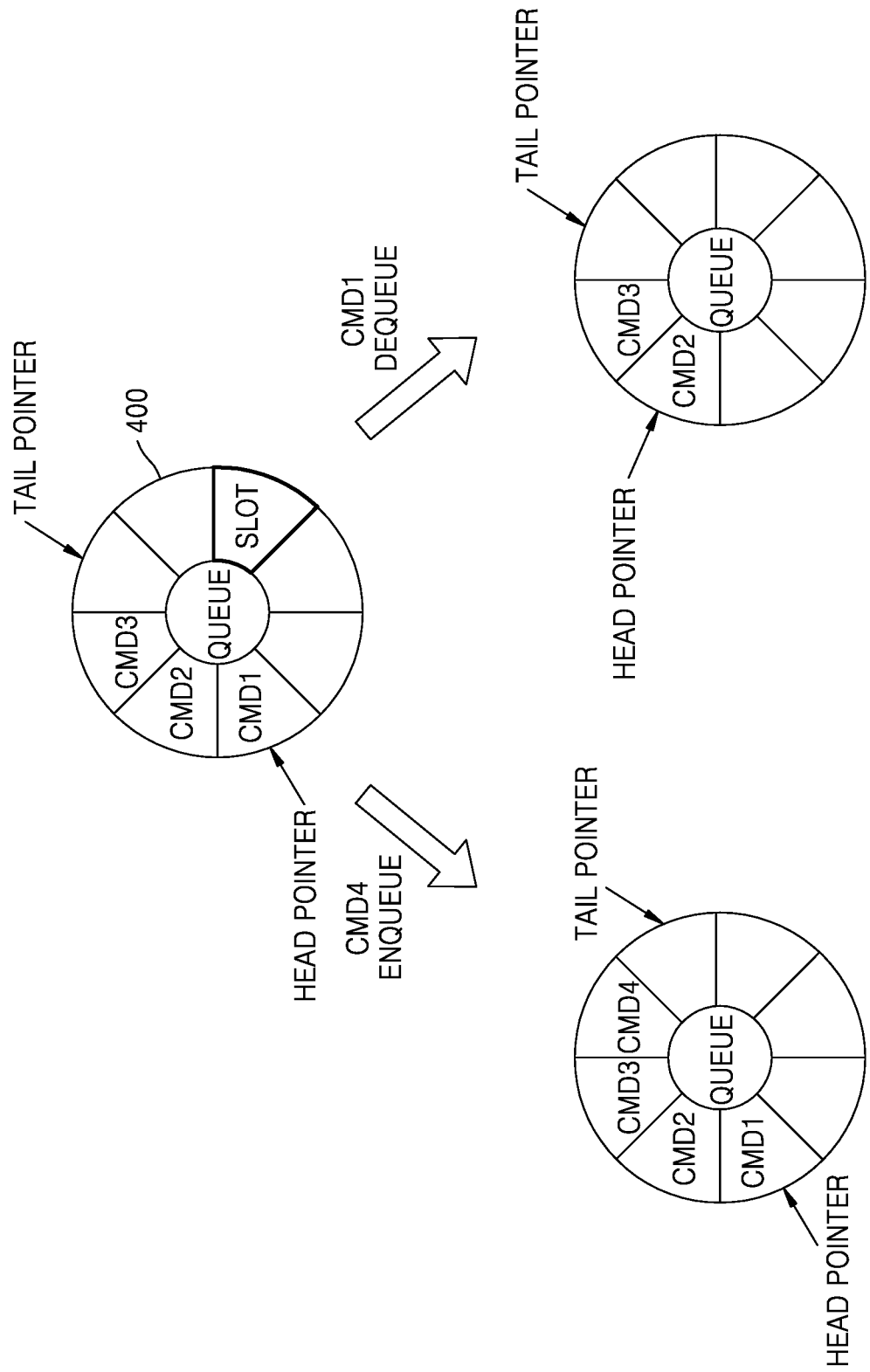
FIG. 2 is a diagram illustrating an enqueue process and a dequeue process of a command queue.

FIG. 2 is a diagram illustrating an enqueue process and a dequeue process of a command queue 400.

Referring to FIG. 2, the command queue 400 may include a plurality of slots. One command may be stored in a slot. The command queue 400 may store a first command CMD1, a second command CMD2, and a third command CMD3. The command queue 400 may be the host submission queue hSQ, the host completion queue hCQ, the storage submission queue sSQ, or the storage completion queue sCQ described above with reference to FIG. 1.

The first to third commands CMD1, CMD2, and CMD3 may be sequentially stored in the command queue 400. A head pointer may point to a slot address of a command stored earliest in the command queue 400. A tail pointer may point to a slot address that is next to a slot of a command stored latest in the command queue 400.

During the enqueue process in which a new command is stored in the command queue 400, the tail pointer may change. Specifically, when the fourth command CMD4 is enqueued in the command queue 400, the tail pointer may point to the next slot address.

During the dequeue process in which the command stored in the command queue 400 is removed, the head pointer may change. Specifically, when the first command CMD1 is dequeued in the command queue 400, the head pointer may indicate the next slot address, that is, an address of a slot in which the second command CMD2 is stored.

As shown in FIG. 2, the command queue may be a FIFO type in which a command that is enqueued first is dequeued first. Accordingly, when a command is identified through identifier information, a command stored earlier or later than the identified command may be specified.

According to the storage system 10 of FIG. 1 according to an example embodiment, the host 100 may receive identifier information of a command transmitted to the storage device 200 before an error occurs from the storage device 200, and determine a command to be transmitted to the storage device 200 based on the corresponding identifier information. Also, the storage device 200 may receive identifier information of the command transmitted to the host 100 before the error occurrence from the host 100, and determine identifier information to be transmitted to the host 100 based on the identifier information.

Figure 3:
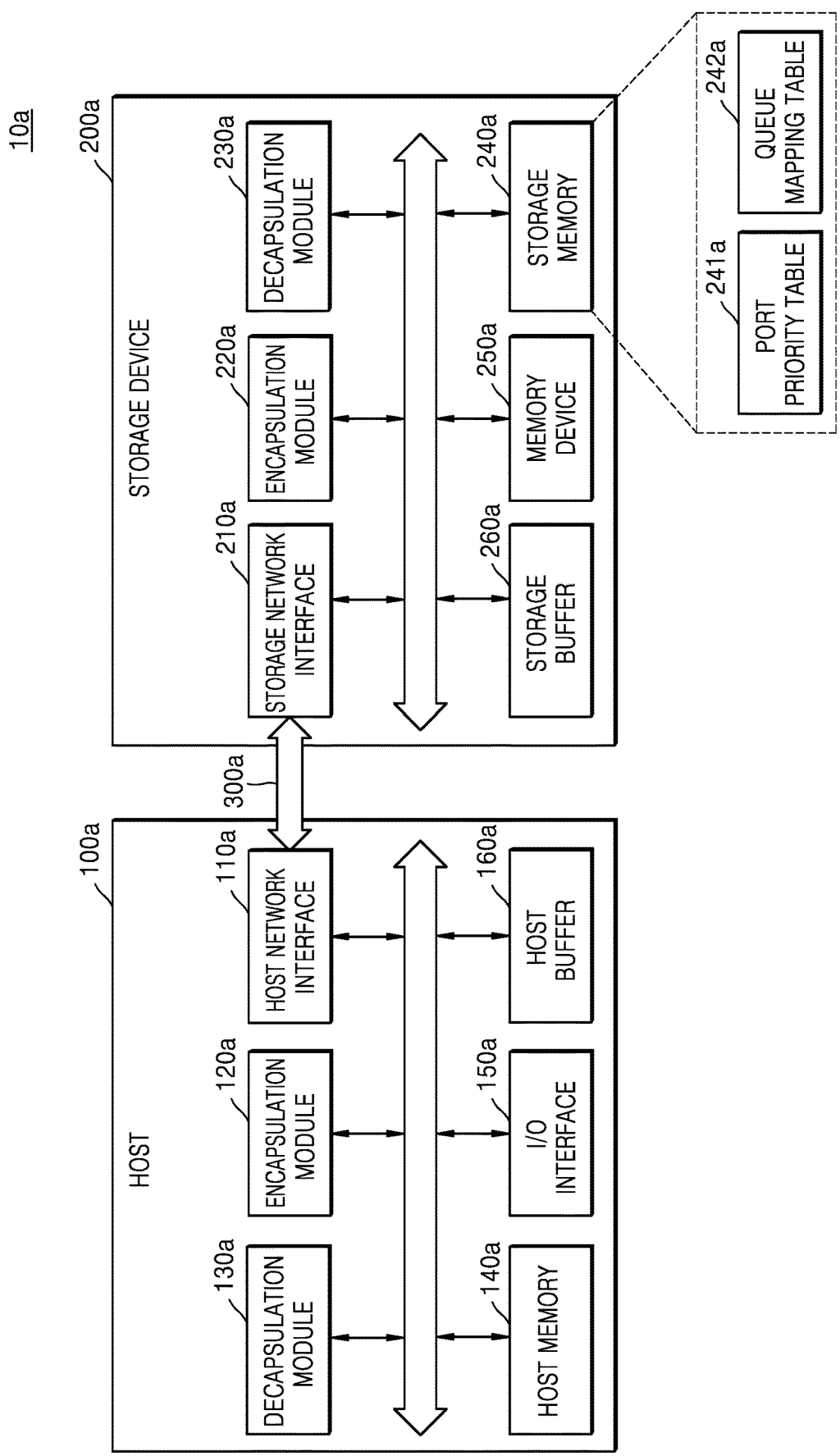
FIG. 3 is a block diagram illustrating an example of a storage system according to an example embodiment.

FIG. 3 is a block diagram illustrating an example of the storage system 10a according to an example embodiment.

Referring to FIG. 3, the storage system 10a may include a host 100a, a storage device 200a, and a network 300a.

The host 100a may be an example of the host 100 of FIG. 1. The host 100a may include a host network interface 110a, an encapsulation module 120a, a decapsulation module 130a, a host memory 140a, an input/output interface 150a, and a host buffer 160a.

The host network interface 110a may communicate with the network 300a. For example, the host network interface 110a may provide interfacing between a network fabric such as Fiber Channel, Ethernet, or InfiniBand, and the host 100a. The host network interface 110a may include a port to be connected to the network 300a.

The encapsulation module 120a may generate a capsule to be transferred to the network 300a through the storage interface 110a. The capsule may be a transmission unit of data exchanged between the host 100a and the storage device 200a, and may include a command, identifier information of the command, data, etc. The encapsulation module 120a may generate the capsule including the command or the identifier information of the command stored in a host queue, and transmit the capsule to the storage interface 110a.

The decapsulation module 130a may perform decapsulation on the capsule received from the network 300a through the storage interface 110a. The decapsulation module 130a may perform decapsulation (or deencapsulation) on the capsule transmitted from the storage device 200a and obtain identifier information of a command processed by the storage device 200a.

The host memory 140a may include the host submission queue hSQ and the host completion queue hCQ.

The encapsulation module 120a may access the host memory 140a to obtain a command or identifier information of the command included in the host submission queue hSQ, and may generate the capsule using the obtained command or identifier information.

The decapsulation module 130a may obtain the identifier information through decapsulation on the capsule received through the network 300a. The decapsulation module 130a may enqueue a command corresponding to the obtained identifier information in the host completion queue hCQ and dequeue the command in the host submission queue hCQ.

The input/output interface 150a may communicate with an external device. The input/output interface 150a may be at least one of a Universal Serial Bus (USB), a High-Definition Multimedia Interface (HDMI), a Mobile High-Definition Link (MHL), Thunderbolt, and an audio interface.

The host buffer 160a may include a reception buffer (not shown) temporarily storing capsules received by the host network interface 110a and a transmission buffer (not shown) temporarily storing capsules transmitted through the host network interface 110a. Commands stored in the host submission queue sCQ may be encapsulated and sequentially transmitted to the transmission buffer, and the capsules stored in the reception buffer may be decapsulated and then sequentially transmitted to the host completion queue hCQ.

The storage device 200a may be an example of the storage device 200 of FIG. 1. The storage device 200a may include a storage network interface 210a, an encapsulation module 220a, a decapsulation module 230a, a storage memory 240a, a memory device 250a, and a storage buffer 260a.

The storage network interface 210a may communicate with the network 300a. For example, the storage network interface 210a may provide interfacing between a network fabric such as Fiber Channel, Ethernet, or InfiniBand and the storage device 200a. The storage network interface 210a may include a port, e.g., a plurality of ports, to be connected to the network 300a.

The encapsulation module 220a may generate a capsule to be transmitted to the network 300a over the storage network interface 210a. The encapsulation module 220a may generate a capsule including identifier information of a command stored in the storage completion queue hCQ, and transmit the capsule to the storage network interface 210a.

The decapsulation module 230a may perform decapsulation on the capsule received from the network 300a through the storage network interface 210a. The decapsulation module 230a may perform decapsulation on the capsule transmitted from the host 100a, and may obtain a command or identifier information of the command.

The storage memory 240a may include the storage submission queue sSQ and the storage completion queue sCQ. The encapsulation module 220a may obtain identifier information of a command included in the storage completion queue sCQ by accessing the storage memory 240a, and generate the capsule using the obtained identifier information. The decapsulation module 230a may enqueue the command obtained through decapsulation in the storage submission queue sCQ.

The storage memory 240a may include a port priority table 241a and a queue mapping table 242a. The port priority table 241a may be a table that stores priorities of a plurality of ports. Accordingly, when an error occurs in any one port, the storage device 200a may determine a port to be connected to the network 300a by referring to the port priority table 241a. The port priority table 241a is described in detail below with reference to FIGS. 4 and 5. The queue mapping table 242a may be a table that stores a mapping relationship between a plurality of ports and a plurality of queue pairs. The queue mapping table 242a is described in detail below with reference to FIGS. 6 and 7.

The memory device 250a may be provided in plural and may be an example of the plurality of memory devices 221, 222, and 223 of FIG. 1, and thus, descriptions thereof will be omitted.

The storage buffer 260a may include a reception buffer (not shown) temporarily storing capsules received by the storage network interface 210a and a transmission buffer (not shown) temporarily storing capsules transmitted through the storage network interface 210a. Commands included in the capsules stored in the reception buffer may be sequentially transmitted to the storage submission queue sSQ, and identifier information of commands stored in the storage completion queue sCQ may be sequentially transmitted to the transmission buffer.

Figure 4:
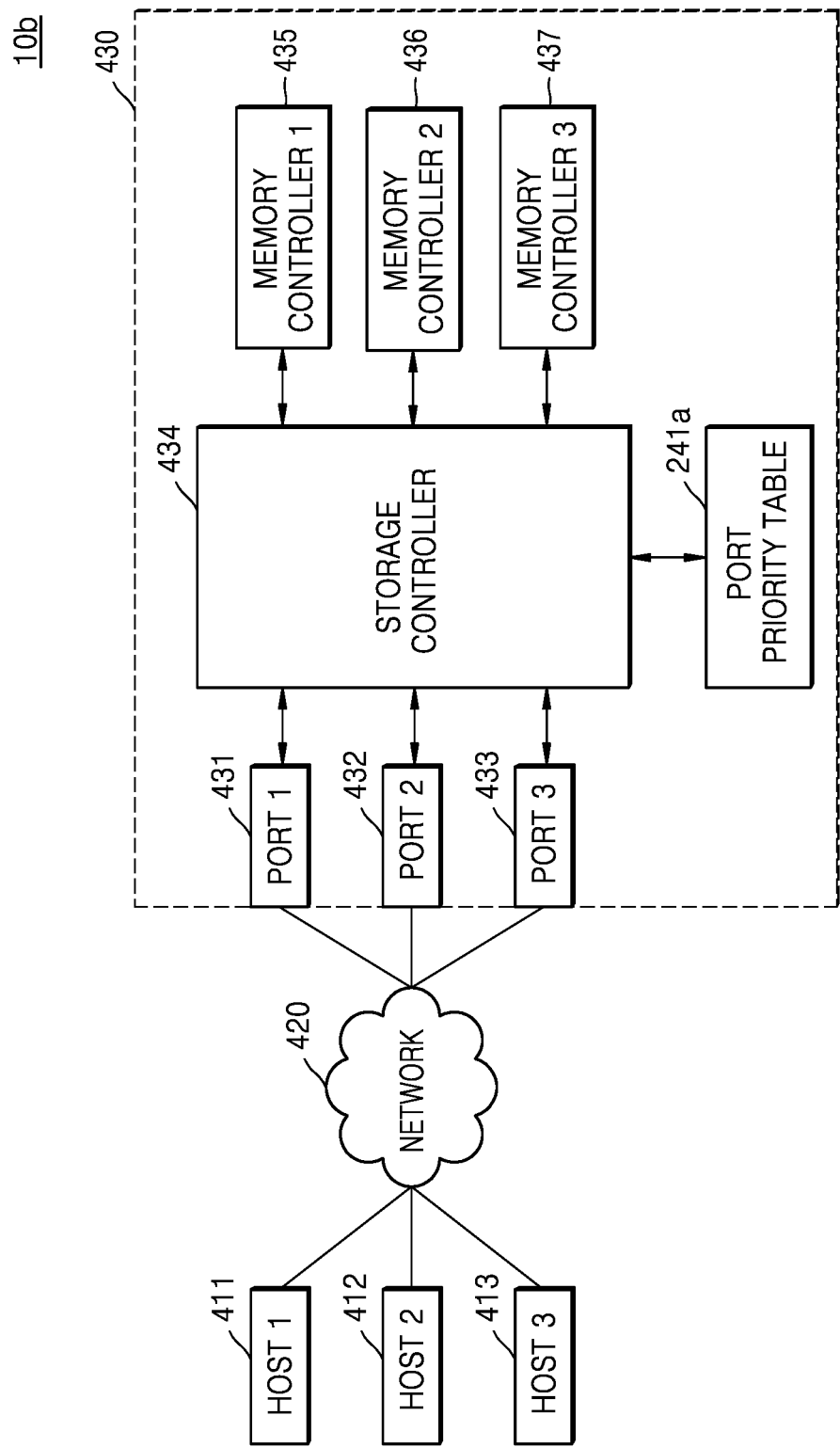
FIG. 4 is a diagram illustrating a storage system according to an example embodiment.
Figure 5:
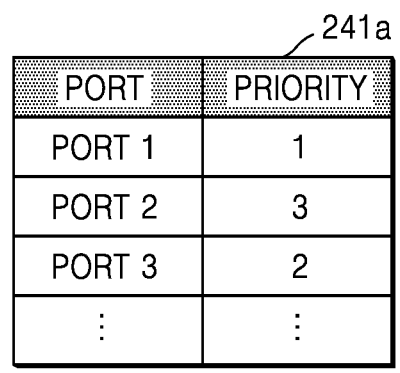
FIG. 5 is a diagram illustrating a network interface (NIF) priority table according to an example embodiment.

FIG. 4 is a diagram illustrating a storage system 10b according to an example embodiment. FIG. 5 is a diagram illustrating the port priority table 241a according to an example embodiment.

Referring to FIG. 4, the storage system 10b may include a plurality of hosts 411, 412, and 413 and a storage device 430.

The storage device 430 may include a plurality of ports 431, 432, and 433. The plurality of ports 431, 432, and 433 may be included in the same network interface or different network interfaces. A storage controller 434 may be connected to one of the plurality of ports 431, 432, and 433, thereby communicating with a network 420.

In an example embodiment, the storage controller 434 may be firstly connected to the first port 431. When an error occurs in communication through the first port 431, the storage controller 434 may connect to another port based on priorities of the plurality of ports 431, 432, and 433. In an example embodiment, the storage controller 434 may connect to another port by referring to the port priority table 241a. The priorities between the plurality of ports 431, 432, and 433 may be previously determined based on a communication speed through the port, an error rate, security, etc.

Referring to FIG. 5, the port priority table 241a may store priorities of the plurality of ports PORT 1, PORT 2, and PORT 3. The priorities may be previously determined based on the communication speed through the port, the error rate, security, etc. The storage controller 434 may be firstly connected to the first port PORT 1 and may communicate with the network 420 through the first port PORT 1. When the error occurs in communication through the first port PORT 1, the storage controller 434 may connect to the third port PORT 3 having the next priority by referring to the port priority table 241a.

In another example embodiment, the storage controller 434 may determine a port to be connected to based on traffic with respect to each of a plurality of ports. For example, the storage controller 434 may determine the number of hosts communicating with the respective ports and predict traffic based on the number of hosts. The capsule may include identification information of a host. Accordingly, the storage controller 434 may determine the number of hosts communicating with a port through identifier information received through the port.

Referring again to FIG. 4, the storage device 430 may include a plurality of memory controllers 435, 436, and 437. The memory controllers 435, 436, and 437 may be included in the memory devices 221, 222, and 223 of FIG. 1, respectively. The storage controller 434 may provide the received command to at least one of the plurality of memory controllers 435, 436, and 437. The memory controllers 435, 436, and 437 may control an operation corresponding to the received command to be performed in a storage space included in a memory device.

Figure 6:
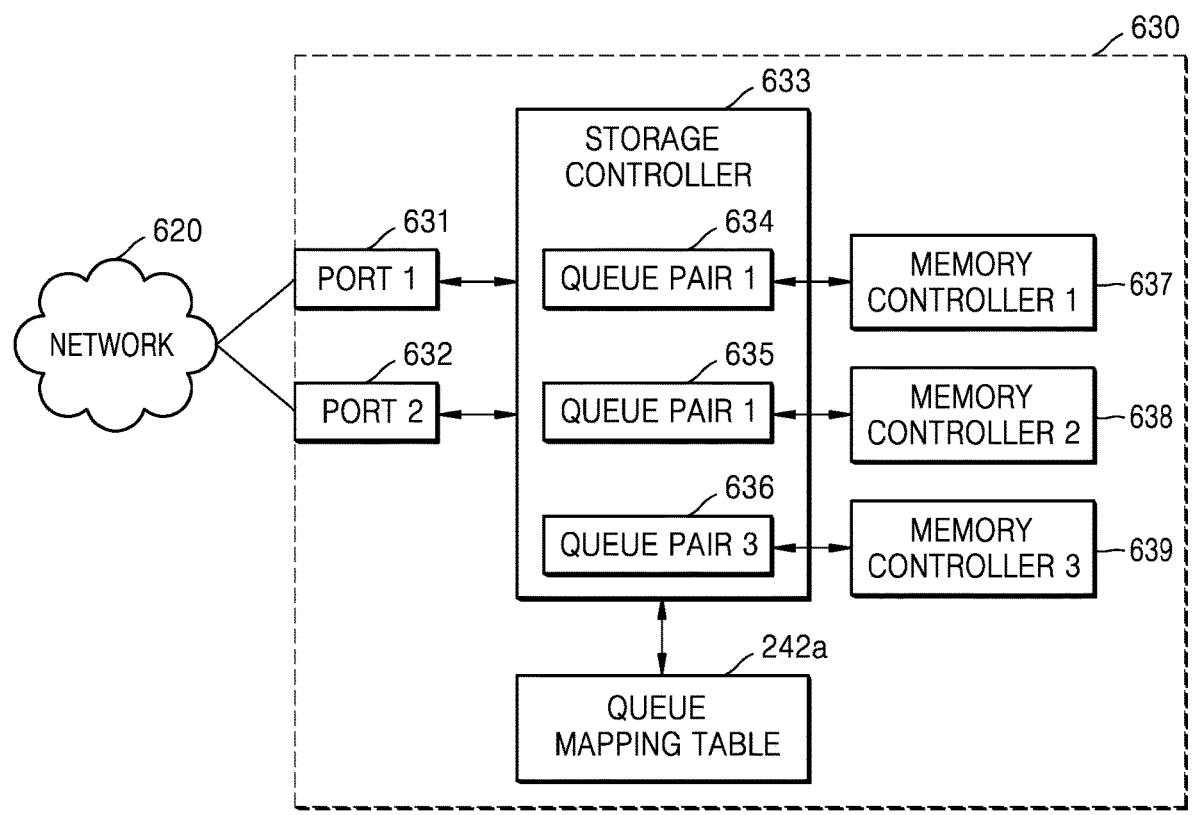
FIG. 6 is a diagram illustrating a storage device according to an example embodiment.
Figure 7:
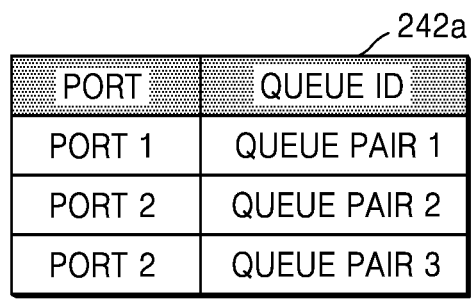
FIG. 7 is a diagram illustrating a queue mapping table according to an example embodiment.

FIG. 6 is a diagram illustrating a storage device 630 according to an example embodiment. FIG. 7 is a diagram illustrating the queue mapping table 242a according to an example embodiment.

Referring to FIG. 6, the storage device 630 may include first and second ports 631 and 632, a storage controller 633, and the queue mapping table 242a.

The storage device 630 may be connected to a network 620 through the first or second port 631 or 632. The first and second ports 631 and 632 may be included in the same network interface or different network interfaces.

The storage controller 633 may include a plurality of queue pairs 634, 635, and 636. Each of the plurality of queue pairs 634, 635, and 636 may be mapped to one of the first or second port 631 or 632, and the mapping relationship may be stored in the queue mapping table 242a.

The plurality of queue pairs 634, 635, and 636 may respectively provide commands to a plurality of memory controllers 637, 638, and 639. The memory controllers 637, 638, and 639 may control a corresponding memory device such that operations corresponding to the provided commands are performed.

Referring to FIG. 7, the queue mapping table 242a may store a mapping relationship between a plurality of ports and a plurality of queue pairs. For example, the queue mapping table 242a may store a mapping relationship between the first port PORT 1, the second port PORT 2, a first queue pair QUEUE PAIR 1, a second queue pair QUEUE PAIR 2, and a third queue pair QUEUE PAIR 3. For example, the first port PORT 1 may be mapped to the first queue pair QUEUE PAIR 1, and the second port PORT 2 may be mapped to the second queue pair QUEUE PAIR 2 as well as the third queue pair QUEUE PAIR 3.

When an error occurs in communication through the first port PORT 1, the storage controller 633 may update the queue mapping table 242a so that a queue pair mapped to the first port PORT 1 is mapped instead to the second port PORT 2. Specifically, the storage controller 633 may update the queue mapping table 242a so that the first queue pair QUEUE PAIR 1 is mapped to the second port PORT 2.

A capsule received by a port may include queue identifier information. Accordingly, even if one port and a plurality of queue pairs are mapped, the storage controller 633 may transmit a command received by the port to a queue pair corresponding to the identifier information.

Figure 8:
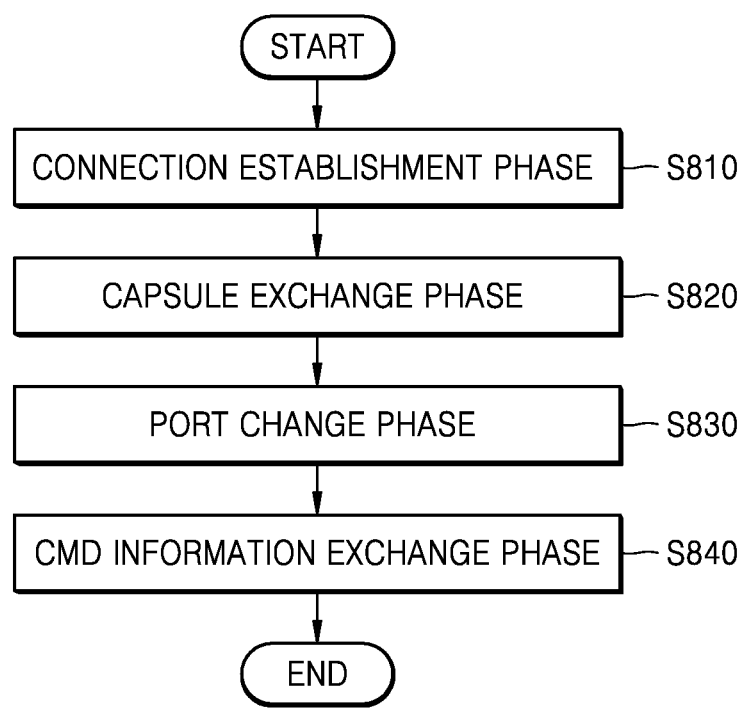
FIG. 8 is a diagram illustrating an operating method of a storage system according to an example embodiment.

FIG. 8 is a diagram illustrating an operating method of a storage system according to an example embodiment.

Referring to FIG. 8, in the operating method of the storage system according to the present example embodiment, in operation S810, a connection between a host and a storage device may be established. The host may discover the storage device (using, e.g., at least one of identifier information of the storage device, identifier information of a port included in a storage network interface, and identifier information of a storage queue) and establish a connection with the found storage device. The storage device may discover the host (using, e.g., at least one of identifier information of the host, identifier information of a host network interface, and identifier information of a host queue) and establish a connection with the found host. For example, the connection may be established by exchanging identification information such as an IP address, a MAC address, and a port number between the host and the storage device.

In operation S820, a capsule may be exchanged between the host and the storage device. For example, the host may generate a command capsule including a command, and transmit the command capsule to the storage device over a network. The storage device may process the received command, generate a response capsule including identifier information of the processed command, and transmit the response capsule to the host over the network.

In operation S830, a port of the storage device communicating with the host may be changed. For example, when an error occurs in communication through a first port, the storage device and the host may communicate through a second port. As described in detail above with reference to FIGS. 3 to 5, the storage device may change ports based on a plurality of priorities. In another implementation, the storage device may change ports based on traffic.

In operation S840, the host and the storage device may exchange information about the command. For example, each of the host and the storage device may exchange information about a command received before the error occurrence. For example, the host may transmit identifier information of the command received from the storage device before the error occurrence to the storage device through a changed port. Also, the storage device may transmit the identifier information of the command received from the host before the error occurrence to the host through a port. The host may determine a command to be transmitted to the storage device through the changed port (e.g., a command among commands stored in a host queue) based on the identifier information received from the storage device. Also, the storage device may determine a command transmitted to the host through the changed port (e.g., a command among commands stored in a storage queue) based on the identifier information received from the host.

Figure 9:
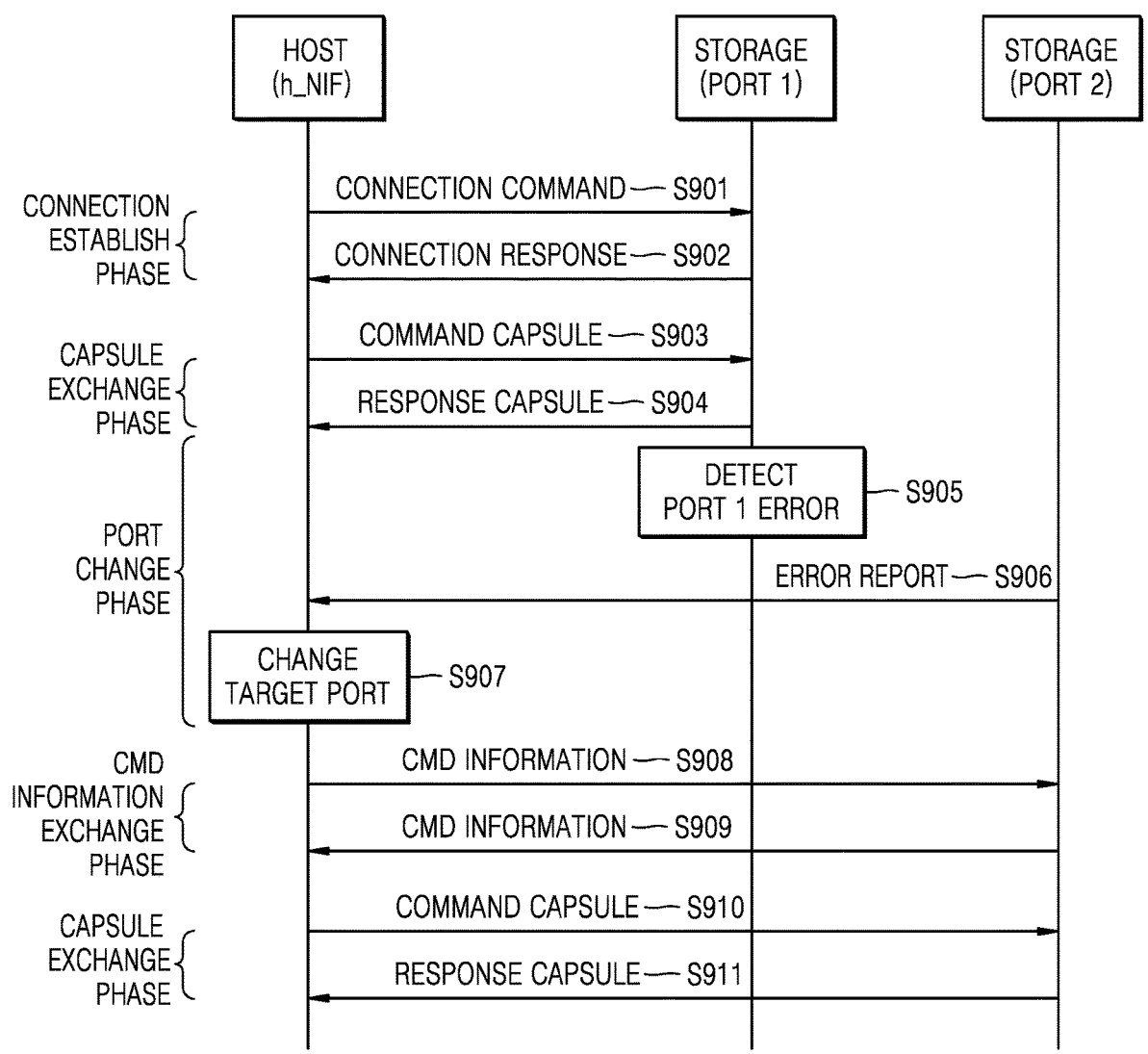
FIG. 9 is a diagram illustrating an operating method of a storage system according to an example embodiment.

FIG. 9 is a diagram illustrating an operating method of a storage system according to an example embodiment.

Referring to FIG. 9, the operating method of the storage system according to the present example embodiment may include a connection establishment operation, a capsule exchange operation, a port change operation, a CMD information exchange operation, and a capsule exchange operation.

The connection establishment operation may include operations S901 and S902. In operation S901, a host may transmit a connection command to a storage device. The connection command may include at least one of identifier information of the storage device, port identifier information of a network interface included in the storage device, and identifier information of a storage queue. In operation S902, the storage device receiving the connection command may transmit a connection response to the host. The connection response may include at least one of identifier information of the host, identifier information of a network interface included in the host, and identifier information of a host queue. For convenience of explanation, although the connection command and the connection response are shown to be transmitted once, the connection between the host and the storage device may be established in a method such as 3-way handshaking or 4-way handshaking. After the connection establishment operation, the host and the storage device may communicate through the first port PORT 1. However, because the host may know identifier information of the second port PORT 2, when an error occurs in the first port PORT 1, the host may communicate with the storage device through the second port PORT 2.

The capsule exchange operation may include operations S903 and S904. In operation S903, the host may transmit a command capsule to the storage device through the first port PORT 1. The command capsule may include at least one of a command, identifier information of the command, identifier information of the host, identifier information of a network interface included in the host, identifier information of a host queue, a head pointer of the host queue, a tail pointer of the host queue, or data. In operation S904, the storage device may transmit a response capsule to the host through the first port PORT 1. The response capsule may include at least one of a command, identifier information of the command, identifier information of the storage device, identifier information of a network interface included in the storage device, identifier information of a storage queue, a head pointer of the storage queue, a tail pointer of the storage queue, or data.

The port change operation may include operations S905 to S907. In operation S905, the storage device may detect that a communication error has occurred through the first port PORT 1. The error may be detected by a monitoring circuit that monitors a current or voltage of the first port PORT 1. In another implementation, the error may be detected based on error check information included in the capsule received through the first port PORT 1. Error detection using the error check information will be described in detail below with reference to FIGS. 10 and 11. In operation S906, the storage device may transmit error occurrence information to the host through the second port PORT 2. The error occurrence information may be included in the response capsule. In operation S907, the host may change a target storage network interface from the first port PORT 1 to the second port PORT 2. For example, the host may include identifier information of the second port PORT 2 in the capsule, and the capsule may reach the second port PORT 2 through a network switching by referring to the identifier information.

In the command CMD information exchange operation, the host and the storage device may exchange information about the command through the second port PORT 2. For example, the host may transmit identifier information of the command stored in the host queue to the storage device, and the storage device may transmit the identifier information of the command stored in the storage queue to the host. The CMD information exchange operation is described in detail below with reference to FIGS. 12 to 15.

In the capsule exchange operation, the host and the storage device may exchange a capsule including information about a command determined based on the identifier information received in the CMD information exchange operation. A method of determining a command based on the identifier information is described in detail below with reference to FIGS. 12 to 15.

Figure 10:
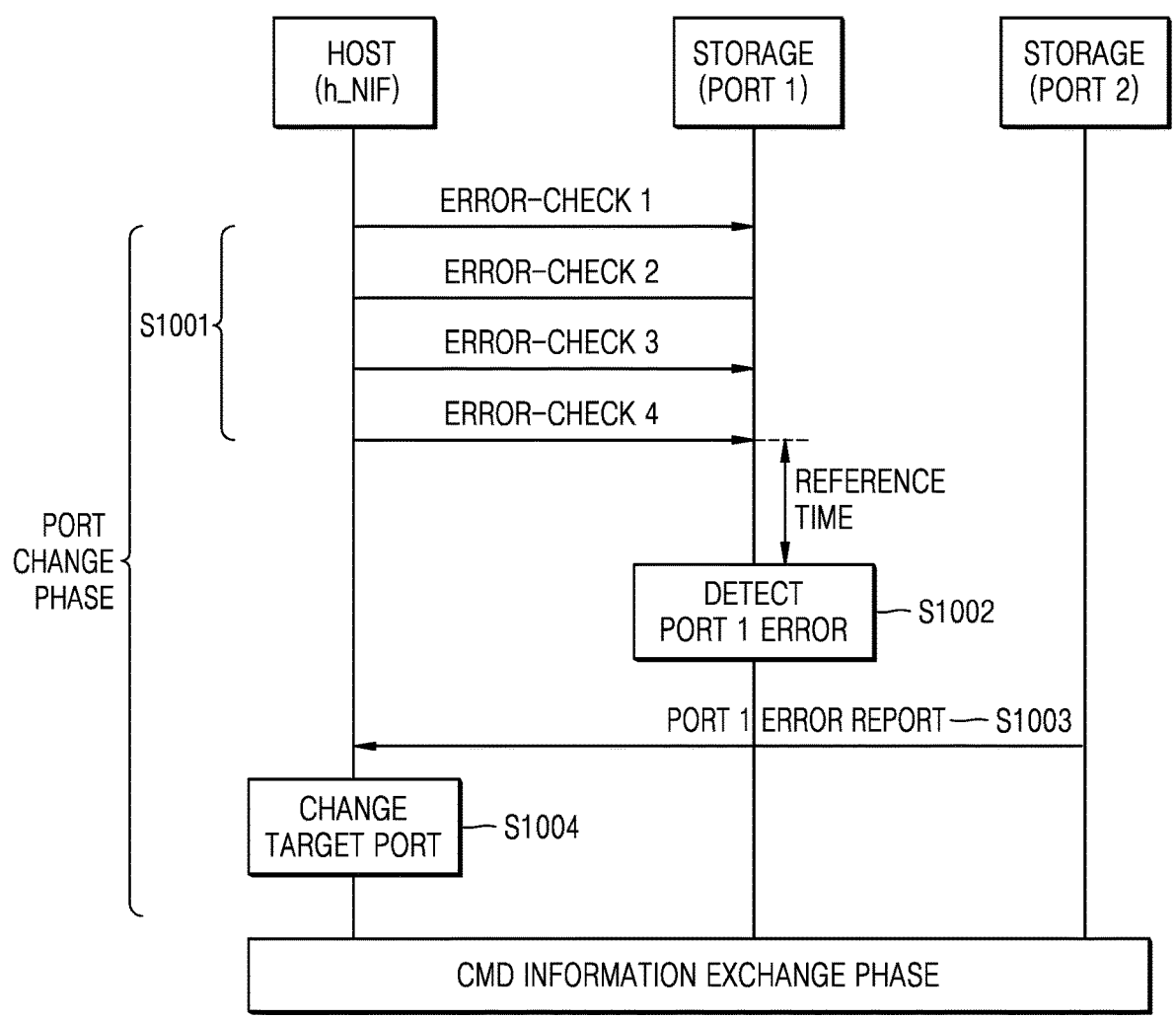
FIG. 10 is a diagram illustrating an NIF exchange operation according to an example embodiment.

FIG. 10 is a diagram illustrating a port exchange operation according to an example embodiment.

Referring to FIG. 10, in operation S1001, a host may transmit a capsule including error check information to a storage device through a first port PORT 1. When the error check information is received, the storage device may check that communication through the first port PORT 1 is normal. The error check information may be referred to as keep-alive information.

In operation S1002, when a time interval for the error check information to reach the storage device exceeds a reference time, the storage device may determine that a communication error has occurred through the first port PORT 1. The reference time may also be referred to as a timeout. Upon detecting the error, in operation S1003, the storage device may transmit error occurrence information indicating that a communication error has occurred through the first port PORT 1 to the host. The host may receive the error occurrence information and may change a target port from the first port PORT 1 to the second port PORT 2 in operation S1004.

Figure 11:
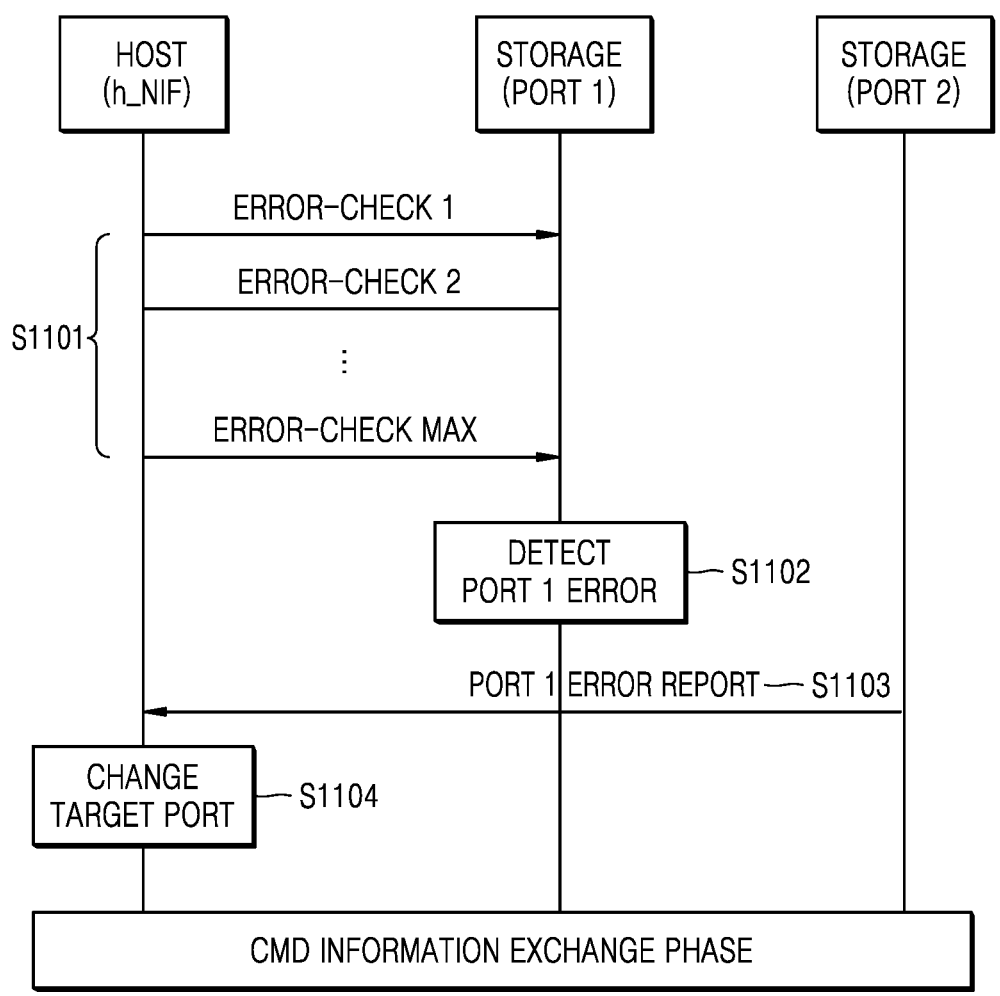
FIG. 11 is a diagram illustrating an NIF exchange operation according to an example embodiment.

FIG. 11 is a diagram illustrating an NIF exchange operation according to an example embodiment.

Referring to FIG. 11, in operation S1101, a host may periodically transmit a capsule including error check information to a storage device through the first port PORT 1. The storage device may count the number of times the error check information is received. In operation S1102, the storage device may compare the counted number of times to a maximum value, and when the counted number of times reaches the maximum value, may determine that a communication error has occurred through the first port PORT 1. When the number of times the error check information is received reaches the maximum value, in operation S1103, the storage device may transmit error occurrence information indicating that a communication error has occurred through the second port PORT 2 to the host. The host may receive the error occurrence information and may change the target port from the first port PORT 1 to the second port PORT 2 in operation S1104.

Figure 12:
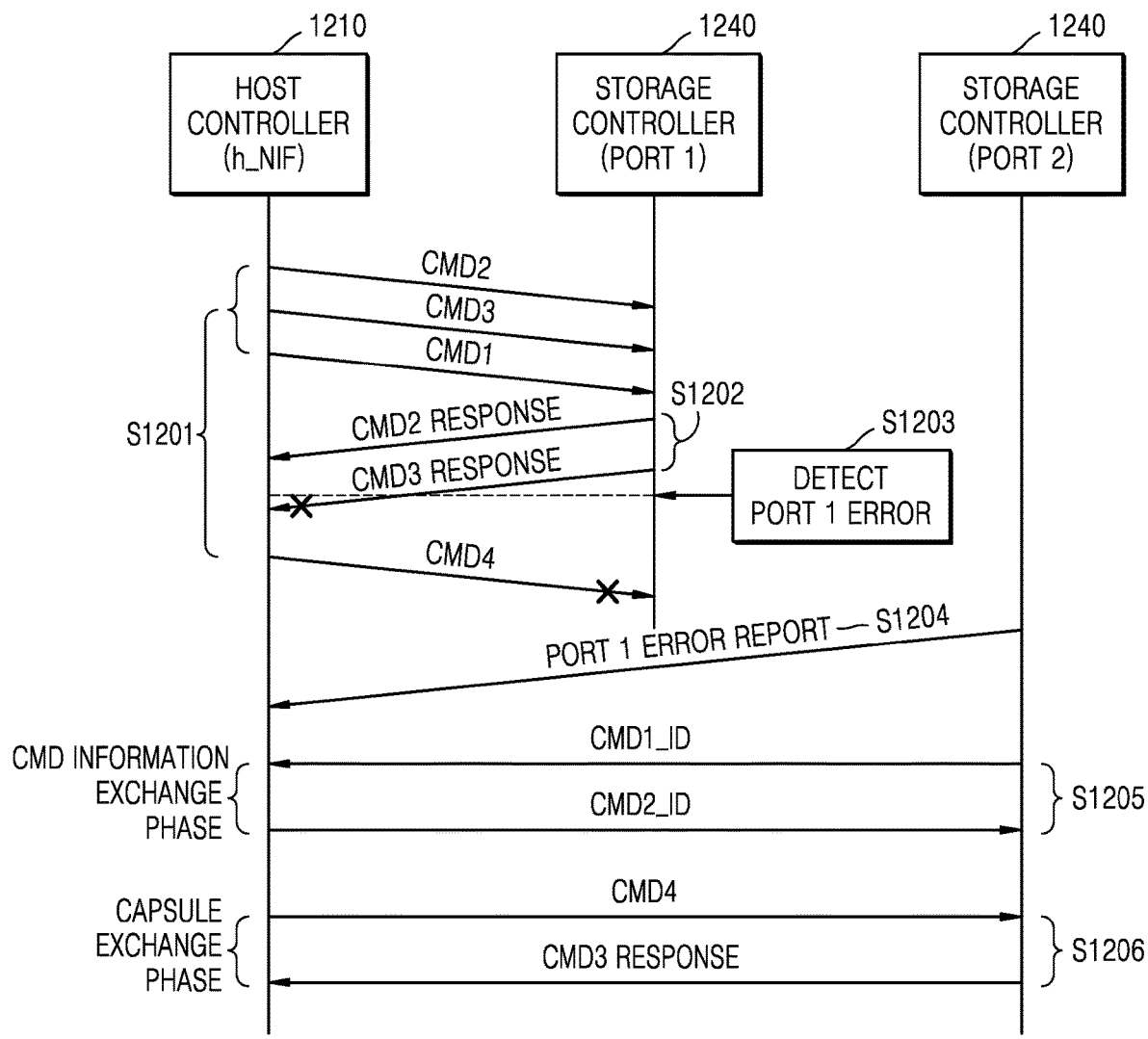
FIG. 12 is a diagram illustrating an operating method of a storage system according to an example embodiment.

FIG. 12 is a diagram illustrating an operating method of a storage system according to an example embodiment.

Referring to FIG. 12, the operating method of the storage system according to the present example embodiment may include a plurality of operations S1201 to S1207.

In operation S1201, a host controller 1210 may sequentially generate second, third, first, and fourth commands CMD2, CMD3, CMD1, and CMD4, and sequentially transmit the second, third, first, and fourth commands CMD2, CMD3, CMD1, and CMD4 to a storage controller 1240 through the first port PORT 1. In operation S1201, the generated second, third, first, and fourth commands CMD2, CMD3, CMD1, and CMD4 may be stored in a host submission queue 1211. The second, third, and first commands CMD2, CMD3, and CMD1 may be transferred to the storage submission queue sSQ included in the storage controller 1240, whereas the fourth command CMD4 may not be transferred to the storage submission queue sSQ included in the storage controller 1240 due to an error of the first port PORT 1 that will be described below.

In operation S1202, the storage controller 1240 may process the second, third, and first commands CMD2, CMD3, and CMD1 received from the host controller 1210, and sequentially transmit responses to the processed commands to the host controller 1210 through the first port PORT 1. However, as will be described below, the response to the third command CMD3 may not reach the host controller 1210 due to the error. The host controller 1210 may receive the response to the second command CMD2, dequeue the second command CMD2 from the host submission queue hSQ, and enqueue the second command CMD2 in the host completion queue hCQ.

In operation S1203, the storage controller 1240 may detect the error in communication through the first port PORT 1. In operation S1204, the storage controller 1240 may transmit error occurrence information of the first port PORT 1 to the host controller 1210 through the second port PORT 2.

Due to the error, in operation S1201, the fourth command CMD4 transmitted by the host controller 1210 through the first port PORT 1 may not reach the storage submission queue sSQ included in the storage controller 1240. In addition, the response to the third command CMD3 transmitted by the storage controller 1240 through the first port PORT 1 may not reach the host completion queue hCQ included in the host controller 1210.

In operation S1205, the host controller 1210 and the storage controller 1240 may exchange identifier information of a command. For example, the storage controller 1240 may provide identifier information CMD1_ID of a first command received from the host controller 1210 before the error occurrence to the host controller 1210. Accordingly, the host controller 1210 may check that the storage controller 1240 has received up to the first command CMD1 among the sequentially transmitted second, third, first, and fourth commands CMD2, CMD3, CMD1, and CMD4. The host controller 1210 may provide identifier information CMD2_ID of a second command received from the storage controller 1240 before the error occurrence to the host controller 1210. Accordingly, the storage controller 1240 may check that the host controller 1210 has received the response to the second command CMD2 among the responses to the commands sequentially transmitted.

In operation S1206, the host controller 1210 and the storage controller 1240 may exchange information about the command based on the identifier information exchanged in operation S1205. For example, the host controller 1210 may transmit the fourth command CMD4 generated after the first command CMD1 to the storage controller 1240 in the form of a capsule through the second port PORT 2. The storage controller 1240 may transmit the response to the third command CMD3 processed after the second command CMD2 to the host controller 1210 in the form of a capsule through the second port PORT 2.

Figure 13:
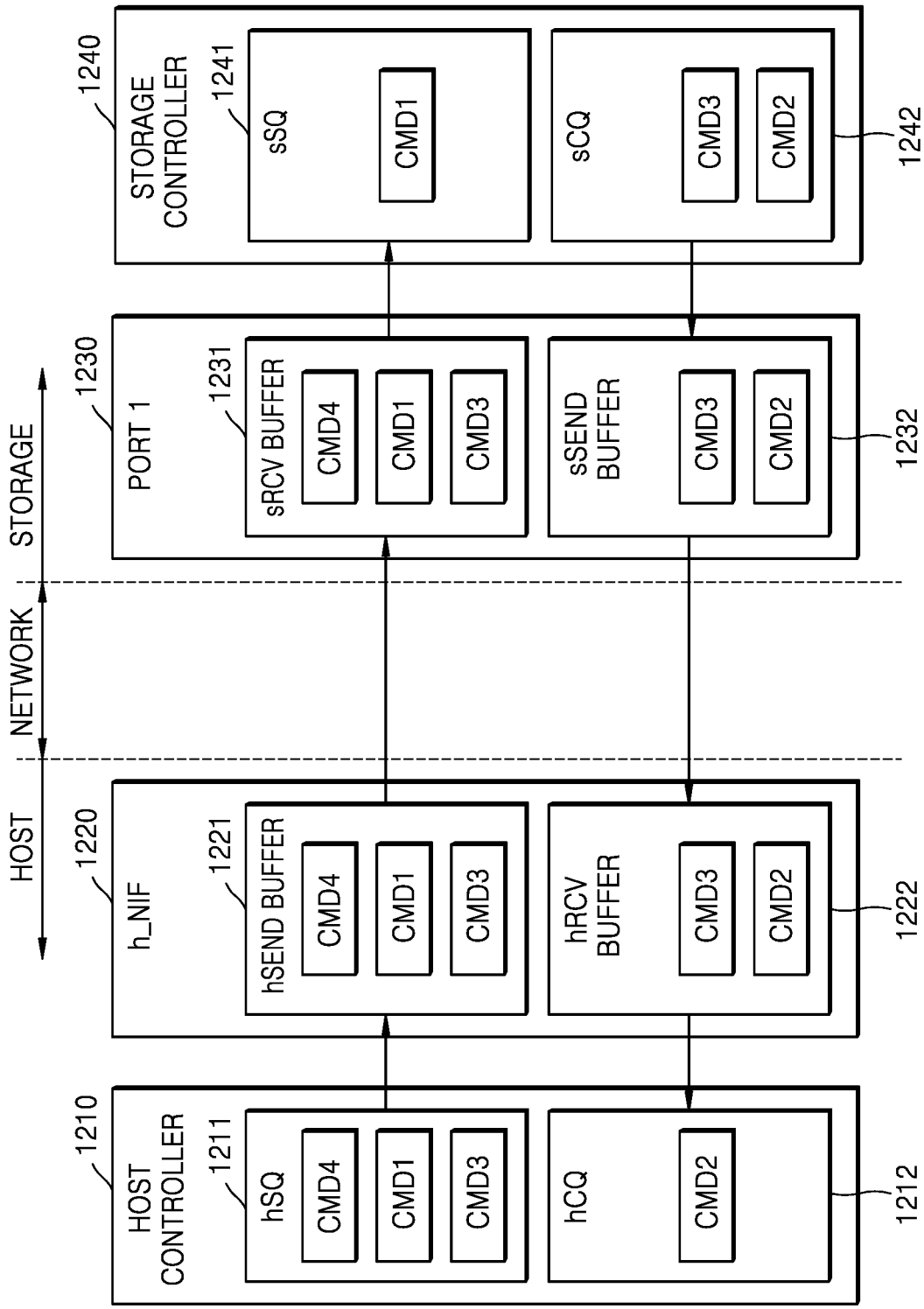
FIG. 13 is a diagram illustrating a state in which information about a command is stored in a storage system when an error occurs according to an example embodiment.

FIG. 13 is a diagram illustrating a state in which information about a command is stored in a storage system when an error occurs, according to an example embodiment.

Referring to FIG. 13, when the error occurs in a first port 1230, the host submission queue 1211 may store the third, first, and fourth commands CMD3, CMD1, and CMD4, and the host completion queue 1212 may store the second command CMD2. Thus, as shown in operation S1202 of FIG. 12, the host controller 1210 may receive a response to the second command CMD2 from the storage controller 1240, dequeue the second command CMD2 from the host submission queue 1211, and enqueue the second command CMD2 in the host completion queue 1212.

A host transmission buffer 1221 may store the third, first, and fourth commands CMD3, CMD1, and CMD4. A host reception buffer 1222 may store the second and third commands CMD2 and CMD3. Thus, although a response to the third command CMD3 has reached the host reception buffer 1222, the response may not reach the host completion queue 1212 due to the error.

The first port 1230 may include a storage reception buffer 1231 and a storage transmission buffer 1232. When the error occurs, the storage reception buffer 1231 may store the third, first, and fourth commands CMD3, CMD1, and CMD4, and the storage transmission buffer 1232 may store the second and third commands CMD2 and CMD3.

In addition, when the error occurs, a storage submission queue 1241 may store the first command CMD1, and a storage completion queue 1242 may store the second and third commands CMD2 and CMD3. Thus, as shown in operation S1201 of FIG. 12, although the fourth command CMD4 transmitted to the host controller 1210 has reached the storage reception buffer 1231, due to the error, the fourth command CMD4 may not reach the storage submission queue sSQ. In addition, as shown in operation S1201 of FIG. 12, the storage controller 1240 may receive the second, third, and first commands CMD2, CMD3, and CMD1, and process the second and third commands CMD2 and CMD3.

Figure 14:
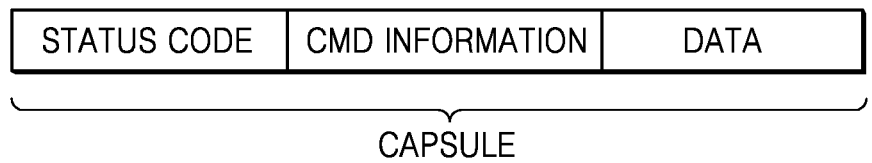
FIG. 14 is a diagram illustrating a structure of a capsule according to an example embodiment.

FIG. 14 is a diagram illustrating a structure of a capsule according to an example embodiment.

Referring to FIG. 14, the capsule may have the structure including one or more of a status code, command information, or data expressed in a predetermined number of bits. The capsule may be an example of a command capsule or a response capsule.

The status code may indicate whether an error has occurred. For example, the status code may indicate whether the error is detected, as described with reference to FIGS. 10 and 11.

The command information may indicate a type of a command and an identifier of the command. For example, the type of the command may include a write command, a read command, or an erase command, but is not limited thereto. Each command may have a unique command identifier. Accordingly, even if types of a plurality of commands are the same, different command identifiers may be assigned to the plurality of commands.

The data may indicate at least one of an identifier of a host, an identifier of a command queue, an identifier of a storage device, an identifier of a storage controller, an identifier of a network interface, data to be written to the storage device, and data read from the storage device.

Figure 15:
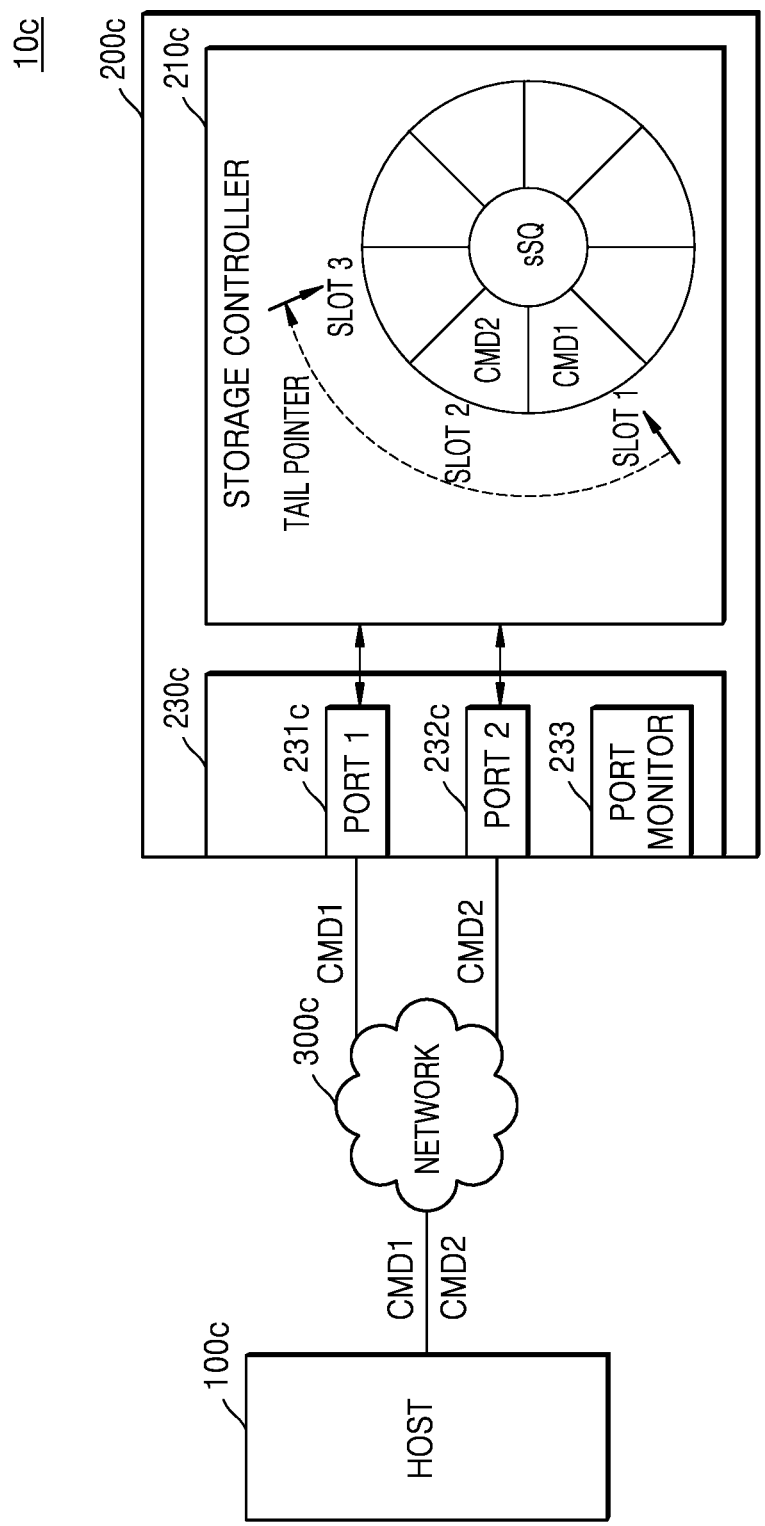
FIG. 15 is a diagram illustrating an example of a storage network interface according to an example embodiment.

FIG. 15 is a diagram illustrating an example of a storage system 10c that includes a storage network interface 230c according to an example embodiment.

Referring to FIG. 15, the storage network interface 230c may include a plurality of ports 231c and 232c, and may receive commands through the plurality of ports 231c and 232c.

When commands are enqueued to the storage submission queue sSQ, slots allocated to the commands may be predetermined. For example, in a Remote Direct Memory Access (RDMA) method, before commands are transmitted over a network 300c, a slot in which each command is to be enqueued may be predetermined. Referring to FIG. 15, the first command CMD1 may be predetermined to be enqueued in a first slot SLOT 1 and the second command CMD2 may be enqueued in a second slot SLOT 2. Before the first and second commands CMD1 and CMD2 are enqueued, a tail pointer may point to the first slot SLOT 1, and after the first and second commands CMD1 and CMD2 are enqueued, the tail pointer may point to the third slot SLOT 3.

A host 100c may transmit the plurality of commands CMD1 and CMD2 to a storage device 200c and specify a port among the plurality of ports 231c and 232c to which each of the plurality of commands CMD1 and CMD2 is to be transferred. Referring to FIG. 15, the first command CMD1 may be transmitted to the first port 231c, and the second command CMD2 may be transmitted to the second port 232c. The host 100c may sequentially transmit the first and second commands CMD1 and CMD2 to the network 300c.

Meanwhile, the order in which the first and second commands CMD1 and CMD2 reach the storage network interface 230c may change due to a latency of the network 300c. For example, the second command CMD2 transmitted by the host 100c relatively late may reach the storage network interface 230c relatively earlier. Because the second command CMD2 is enqueued to the predetermined second slot SLOT 2, when the tail pointer increases by 1, the tail pointer may point to the wrong slot SLOT 1. Accordingly, the storage device 200c according to the present example embodiment may manage a storage submission queue by increasing the tail pointer by 2 when both the first and second commands CMD1 and CMD2 are received.

The storage network interface 230c according to an example embodiment may include a port monitor 233. The port monitor 233 may monitor whether commands to be enqueued in predetermined slots are all received by monitoring the plurality of ports 231c and 232c. When all commands to be enqueued are received, the port monitor 233 may manage the storage submission queue by increasing the tail pointer by the number of received commands.

Meanwhile, as described above with reference to FIGS. 1 to 14, when an error occurs in one of the plurality of ports 231c and 232c, the storage device 200c may exchange information about a command with the host 100c. For example, when the error occurs in the second port 232c, the storage device 200c may exchange information about commands transmitted/received through the second port 232c before the error occurrence with the host 100c through the first port 231c.

Figure 16:
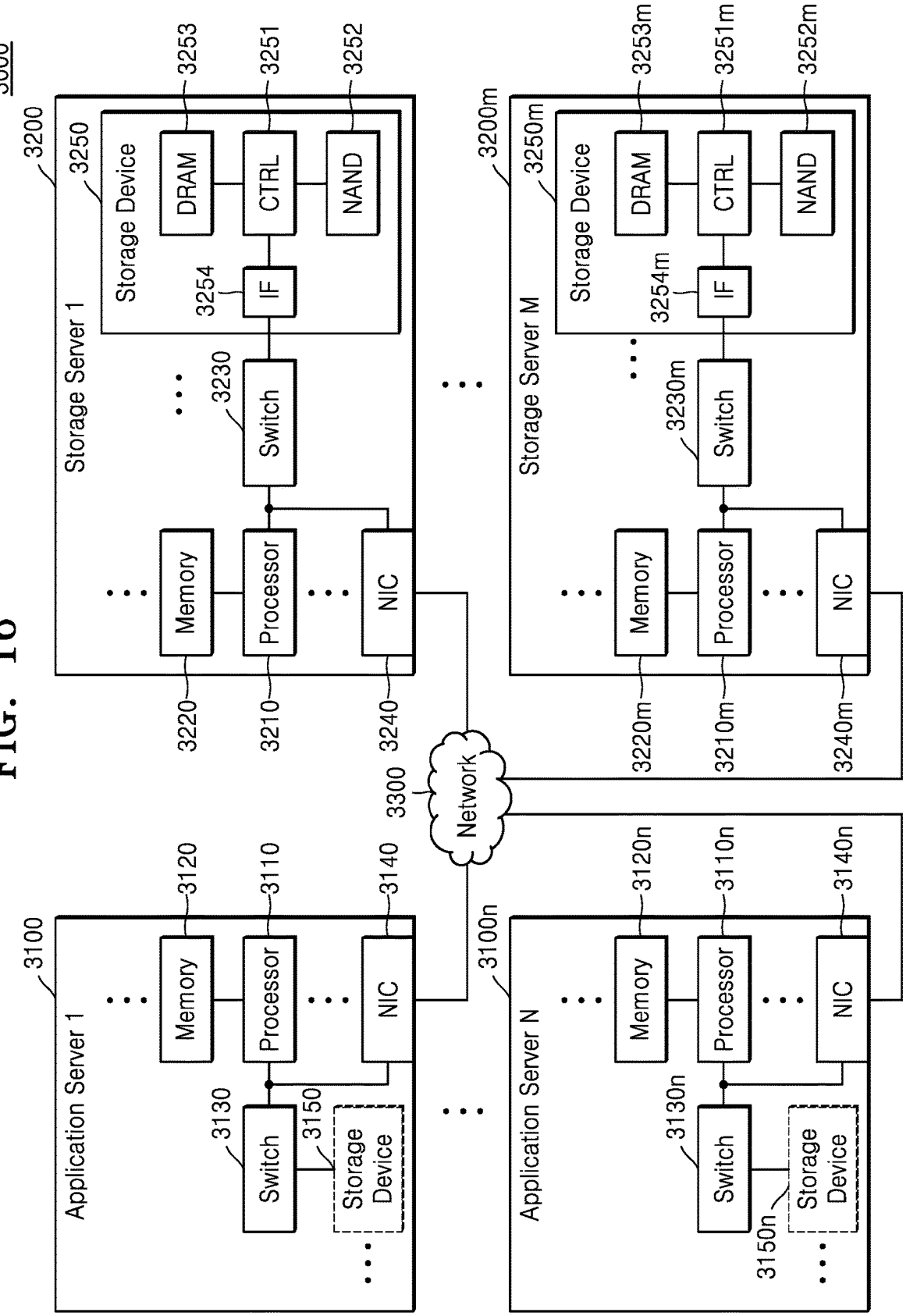
FIG. 16 is a diagram illustrating a data center to which a storage device is applied according to an example embodiment.

FIG. 16 is a diagram illustrating a data center 3000 to which a storage device is applied according to an example embodiment.

Referring to FIG. 16, the data center 3000 is a facility that collects various types of data and provides services, and may be referred to as a data storage center. The data center 3000 may be a system for operating a search engine and a database, and may be a computing system used by a company such as a bank or a government institution. The data center 3000 may include application servers 3100 to 3100n and storage servers 3200 to 3200m. The number of application servers 3100 to 3100n and the number of storage servers 3200 to 3200m may be variously selected according to embodiments, and the number of application servers 3100 to 3100n and the storage servers 3200 to 3200 3200m may be different.

The application server 3100 or the storage server 3200 may include at least one of processors 3110 and 3210 and memories 3120 and 3220. Taking the storage server 3200 as an example, the processor 3210 may control the overall operation of the storage server 3200, and access the memory 3220 to execute instructions and/or data loaded into the memory 3220. The memory 3220 may be Double Data Rate Synchronous DRAM (DDR SDRAM), High Bandwidth Memory (HBM), Hybrid Memory Cube (HMC), Dual In-line Memory Module (DIMM), Optane DIMM, or Non-Volatile DIMM (NVDIMM). According to example embodiments, the number of processors 3210 and the number of memories 3220 included in the storage server 3200 may be variously selected. In an example embodiment, the processor 3210 and the memory 3220 may provide a processor-memory pair. In an example embodiment, the number of processors 3210 and the number of memories 3220 may be different. The processor 3210 may include a single core processor or a multiple core processor. The description of the storage server 3200 may be similarly applied to the application server 3100. According to example embodiments, the application server 3100 may not include a storage device 3150. The storage server 3200 may include at least one storage device 3250. The number of storage devices 3250 included in the storage server 3200 may be variously selected according to example embodiments.

The application servers 3100 to 3100n and the storage servers 3200 to 3200m may communicate with each other over a network 3300. The network 3300 may be implemented using Fiber Channel (FC) or Ethernet. In this case, the FC may be a medium used for relatively high-speed data transmission, and may use an optical switch that provides high performance/high availability. The storage servers 3200 to 3200m may be provided as file storage, block storage, or object storage according to an access method of the network 3300.

In an example embodiment, the network 3300 may be a storage-only network such as a storage area network (SAN). For example, the SAN may be an FC-SAN that uses an FC network and is implemented according to FC Protocol (FCP). For another example, the SAN may be an IP-SAN that uses a TCP/IP network and is implemented according to an SCSI over TCP/IP or Internet SCSI (iSCSI) protocol. In another example embodiment, the network 3300 may be a general network such as a TCP/IP network. For example, the network 3300 may be implemented according to protocols such as FC over Ethernet (FCoE), Network Attached Storage (NAS), and NVMe over Fabrics (NVMe-oF).

Hereinafter, the application server 3100 and the storage server 3200 will be mainly described. The description of the application server 3100 may be applied to the other application server 3100n, and the description of the storage server 3200 may also be applied to the other storage server 3200m.

The application server 3100 may store data requested to be stored by a user or a client in one of the storage servers 3200 to 3200m over the network 3300. In addition, the application server 3100 may obtain data requested to be read by the user or the client from one of the storage servers 3200 to 3200m over the network 3300. For example, the application server 3100 may be implemented as a web server or a database management system (DBMS).

The application server 3100 may access a memory 3120n or a storage device 3150n included in the other application server 3100n over the network 3300, or may access memories 3220 to 3220m or storage devices 3250 to 3250m included in the storage servers 3200 to 3200m over the network 3300. Accordingly, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. At this time, the data may move from the storage devices 3250 to 3250m of the storage servers 3200 to 3200m to the memories 3120 to 3120n of the application servers 3100-3100n directly through the memories 3220 to 3220m of the storage servers 3200 to 3200m. The data that moves over the network 3300 may be encrypted data for security or privacy.

Taking the storage server 3200 as an example, an interface 3254 may provide a physical connection between the processor 3210 and the controller 3251 and a physical connection between a NIC 3240 and a controller 3251. For example, the interface 3254 may be implemented in a Direct Attached Storage (DAS) method of directly connecting the storage device 3250 with a dedicated cable. In addition, for example, the interface 1254 may be implemented in various interface methods such as an Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), secure digital (SD) card, multi-media card (MMC), embedded multi-media card (eMMC), Universal Flash Storage (UFS), embedded Universal Flash Storage (eUFS), compact flash (CF) card interface, etc.

The storage server 3200 may further include a switch 3230 and the NIC 3240. The switch 3230 may selectively connect the processor 3210 and the storage device 3250 or may selectively connect the NIC 3240 and the storage device 3250 under the control of the processor 3210.

In an example embodiment, the NIC 3240 may include a network interface card, a network adapter, etc. The NIC 3240 may connect to the network 3300 through a wired interface, a wireless interface, a Bluetooth interface, an optical interface, etc. The NIC 3240 may include an internal memory, a DSP, a host bus interface, etc., and may connect to the processor 3210 and/or the switch 3230 through the host bus interface. The host bus interface may be implemented as one of the examples of the interface 3254 described above. In an embodiment, the NIC 3240 may be integrated with at least one of the processor 3210, the switch 3230, and the storage device 3250.

In an example embodiment, the NIC 3240 may include a plurality of ports. As described above with reference to FIGS. 1 to 15, when an error occurs in one of the ports included in the NIC 3240, the storage server 3200 may communicate with the application server 3100 using another port.

In the storage servers 3200 to 3200m or the application servers 3100 to 3100n, the processor may transmit a command to the storage devices 3130 to 3130n and 3250 to 3250m or the memories 3120 to 3120n and 3220 to 3220m to program or read data. In this case, the data may be error-corrected data through an Error Correction Code (ECC) engine. The data may include data that has been processed by Data Bus Inversion (DBI) or Data Masking (DM), and may include Cyclic Redundancy Code (CRC) information. The data may be encrypted data for security or privacy.

The storage devices 3150 to 3150m and 3250 to 3250m may transmit a control signal and a command/address signal to the NAND flash memory devices 3252 to 3252m in response to a read command received from the processor 3210. Accordingly, when the data is read from the NAND flash memory devices 3252 to 3252m, a read enable (RE) signal may be input as a data output control signal and may serve to output the data to a DQ bus. A Data Strobe (DQS) may be generated by using the RE signal. The command and the address signal may be latched in a page buffer according to a rising edge or a falling edge of a Write Enable (WE) signal.

The controller 3251 may control overall operation of the storage device 3250. In an example embodiment, the controller 3251 may include static random access memory (SRAM). The controller 3251 may write data to the NAND flash 3252 in response to a write command, or read data from the NAND flash 3252 in response to a read command. For example, the write command and/or the read command may be provided from the processor 3210 in the storage server 3200, the processor 3210*m* in another storage server 3200*m*, or the processors 3110 and 3110*n* in the application servers 3100 and 3100*n*. The DRAM 3253 may temporarily store (buffer) data to be written to the NAND flash 3252 or data read from the NAND flash 3252. Also, the DRAM 3253 may store metadata. The metadata may be user data or data generated by the controller 3251 to manage the NAND flash 3252. The storage device 3250 may include a Secure Element (SE) for security or privacy.

By way of summation and review, SSDs may be classified into server SSDs, client SSDs, and data center SSDs in terms of their uses. Interfaces of SSDs should provide optimum speed and reliability for each of these uses, and thus NVMe based on SATA, SAS, and PCIe has been actively researched and applied.

Interfaces of SSDs have been developed to provide ease of expansion in a system such as a large-capacity data center. For example, NVMe over Fabrics (NVMe-oF) has been researched as a standard for placing SSDs in a network fabric such as an Ethernet switch. NVMe-oF supports an NVMe storage protocol over a wide range of storage networking fabrics (e.g., Ethernet, Fiber Channel, InfiniBand, etc.).

As described above, embodiments relate to a storage system for recovering a network error between a host and a storage device. Embodiments may provide a storage system for changing a path between a host and a storage device while using a command queue used before an error occurs, and an operating method thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A storage device, comprising:
a network interface including a plurality of ports configured to communicate with a host, the plurality of ports including a first port and a second port; and
a storage controller including a storage submission queue and a storage completion queue, wherein:
the storage submission queue is configured to store commands to be processed from among commands received from the host,
the storage completion queue is configured to store processed commands,
the storage controller is configured to store a first command received from the host through the first port in the storage submission queue, and upon occurrence of a communication error through the first port, transfer identifier information of the first command to the host through the second port, and
the storage controller is configured to receive identifier information of a second command from the host through the second port upon the error occurrence, and transfer identifier information of a third command, which is processed later than the second command among the processed commands stored in the storage completion queue before the error occurrence, to the host through the second port.

2. The storage device as claimed in claim 1, wherein:
the first port includes a reception buffer configured to temporarily store the processed commands and transfer the processed commands to the host, and
the third command is a command that is stored in the reception buffer before the error occurrence.

3. The storage device as claimed in claim 1, wherein the storage controller is configured to determine that the error has occurred when a time interval at which error check information is received from the host through the first port is longer than a reference time.

4. The storage device as claimed in claim 1, wherein the storage controller is configured to determine that the error has occurred when a number of times error check information is received from the host through the first port exceeds a reference value.

5. The storage device as claimed in claim 1, further comprising:
a plurality of command queue pairs configured to store commands received from the host; and
a queue mapping table indicating a correspondence relationship between the plurality of ports and the plurality of command queue pairs,
wherein the storage controller is configured to update the queue mapping table so that a command queue pair storing the first command corresponds to the second port when the error occurs.

6. The storage device as claimed in claim 1, wherein the storage controller is configured to select the second port from among the plurality of ports based on traffic of the plurality of ports.

7. The storage device as claimed in claim 1, further comprising a priority table indicating priorities of the plurality of ports,
wherein the storage controller is configured to select the second port from among the plurality of ports based on the priority table.

8. The storage device as claimed in claim 1, further comprising a port monitor configured to update a pointer indicating an allocated space of the storage submission queue based on whether all commands have been received in the allocated space through the first port and the second port.

9. An operating method of a storage device that communicates with a host through a plurality of ports included in a network interface of the storage device, the operating method comprising:
exchanging command or identifier information of a command with the host through a first port among the plurality of ports;
in response to occurrence of a communication error through the first port, providing first identifier information of a first command, received from the host before the error occurrence, to the host through a second port among the plurality of ports; and receiving second identifier information of a second command, provided to the host before the error occurrence, from the host through the second port.

10. The operating method as claimed in claim 9, further comprising providing third identifier information of a third command, from among commands received before the error occurrence from the host through the first port, to the host through the second port, wherein the third command is a command that is processed after the second command.

11. The operating method as claimed in claim 9, wherein the providing of the first identifier information includes detecting the communication error through the first port based on a comparison result of a reference time and a time interval at which error check information is received from the host through the first port.

12. The operating method as claimed in claim 9, wherein the providing of the first identifier information includes detecting the communication error through the first port based on a comparison result of a reference value and a number of times error check information is received from the host through the first port.

13. The operating method as claimed in claim 9, wherein the providing of the first identifier information includes selecting the second port from among the plurality of ports based on traffic of the plurality of ports.

14. The operating method as claimed in claim 9, further comprising:

storing commands to be processed from among commands received from the host by a storage submission queue, a storage controller including the storage submission queue and a storage completion queue, and storing processed commands by the storage completion queue, wherein the providing of the first identifier information includes selecting the second port from among the plurality of ports based on a priority table indicating priorities of the plurality of ports.

15. A storage system, comprising: a host including a host queue configured to store a plurality of commands; and a storage device including a storage queue configured to exchange commands with the host through a first port or a second port, and to store exchanged commands, wherein the storage device is configured to, upon occurrence of a communication error in the first port, transfer information about a command stored in the storage queue before the error occurrence to the host through the second port wherein: the host queue includes: a host submission queue configured to store the plurality of commands in order; and a host completion queue configured to store processed commands among the plurality of commands, and the storage queue includes: a storage submission queue configured to store commands to be processed among commands received from the host; and a storage completion queue configured to store processed commands among the commands to be processed.

16. The storage system as claimed in claim 15, wherein the storage device is configured to transfer information about a first command stored in the storage submission queue before the error occurrence to the host through the second port.

17. The storage system as claimed in claim 16, wherein the host is configured to provide a fourth command, stored in the host submission queue after the first command, to the storage device through the second port.

18. The storage system as claimed in claim 17, wherein:

the storage device further includes a first reception buffer configured to temporarily store commands received from the host and configured to transfer the commands to the storage submission queue, and the fourth command is a command that is stored in the first reception buffer before the error occurrence.

19. The storage system as claimed in claim 15, wherein the host is configured to transfer information about a second command, stored in the host completion queue before the error occurrence, to the storage device through the second port.

* * * * *